United States Patent
Fukushima et al.

(10) Patent No.: US 8,532,292 B2
(45) Date of Patent: Sep. 10, 2013

(54) STREAM GENERATION METHOD, BROADCAST RECEIVING APPARATUS, AND DISPLAY METHOD

(75) Inventors: Masaru Fukushima, Kanagawa (JP); Shuichi Sugie, Tokyo (JP); Shinsaku Kiyomoto, Saitama (JP); Tatsuo Shibata, Tokyo (JP); Keigo Majima, Tokyo (JP); Takeshi Kimura, Tokyo (JP); Hideki Kokubun, Tokyo (JP); Go Ohtake, Tokyo (JP)

(73) Assignees: Kyocera Corporation, Kyoto (JP); KDDI Corporation, Tokyo (JP); Nippon Hoso Kyokai, Tokyo (JP)

( * ) Notice: Subject to any disclaimer, the term of this patent is extended or adjusted under 35 U.S.C. 154(b) by 289 days.

(21) Appl. No.: 12/300,999

(22) PCT Filed: May 15, 2007

(86) PCT No.: PCT/JP2007/059943
§ 371 (c)(1),
(2), (4) Date: Feb. 6, 2009

(87) PCT Pub. No.: WO2007/132840
PCT Pub. Date: Nov. 22, 2007

(65) Prior Publication Data
US 2009/0323948 A1    Dec. 31, 2009

(30) Foreign Application Priority Data

May 16, 2006   (JP) .................................. 2006-136982
May 16, 2006   (JP) .................................. 2006-136984

(51) Int. Cl.
*H04N 7/167*    (2011.01)
*G06F 21/00*    (2013.01)

(52) U.S. Cl.
USPC ............................................. 380/234; 380/77

(58) Field of Classification Search
USPC ................. 380/259–261, 262, 279, 249, 235, 380/234, 277–278
See application file for complete search history.

(56) References Cited

U.S. PATENT DOCUMENTS 5,585,866 A * 12/1996 Miller et al. .................... 725/43
6,002,394 A * 12/1999 Schein et al. ................... 725/39

(Continued)

FOREIGN PATENT DOCUMENTS

| CN | 1458762 A | 11/2003 |
| JP | 2001-308846 | 11/2001 |

(Continued)

OTHER PUBLICATIONS

Chinese language office action dated Apr. 13, 2010 and its English language translation for corresponding Chinese application 200780017787.0 lists the references above.

(Continued)

*Primary Examiner* — Kaveh Abrishamkar
*Assistant Examiner* — Carlos M De Jesus, Jr.
(74) *Attorney, Agent, or Firm* — DLA Piper LLP (US)

(57) ABSTRACT

Provided is a system far receiving a initialization packet containing an initial vector for initializing stream encryption algorithm and an identifier of a key for decrypting an encrypted stream, initializing a decryption module, and decrypting the encrypted stream, wherein the system stores an identifier of a key which is needed to decrypt a next program in a initialization packet of a current program and informs a user of whether a desired key has been acquired or not at timing close to start time of the next program.

5 Claims, 6 Drawing Sheets

(56) References Cited

U.S. PATENT DOCUMENTS

| | | | |
|---|---|---|---|
| 6,069,957 A * | 5/2000 | Richards | 380/281 |
| 7,155,611 B2 * | 12/2006 | Wajs et al. | 713/182 |
| 7,620,185 B2 * | 11/2009 | Lahtinen et al. | 380/277 |
| 2002/0061108 A1 * | 5/2002 | Shinohara | 380/278 |
| 2003/0118326 A1 * | 6/2003 | Grooters et al. | 386/94 |
| 2003/0215094 A1 * | 11/2003 | Sato et al. | 380/268 |
| 2004/0247295 A1 * | 12/2004 | Nam et al. | 386/95 |
| 2006/0059090 A1 * | 3/2006 | Lahtinen et al. | 705/50 |
| 2006/0106806 A1 * | 5/2006 | Sperling et al. | 707/10 |
| 2006/0269067 A1 * | 11/2006 | Hauge et al. | 380/278 |

FOREIGN PATENT DOCUMENTS

| | | |
|---|---|---|
| JP | 2002-158651 | 5/2002 |
| JP | 2002300560 A | 10/2002 |
| JP | 2003-333032 | 11/2003 |
| WO | 2006030264 A1 | 3/2006 |

OTHER PUBLICATIONS

Korean language office action dated Aug. 1, 2012 and its English language translation issued in corresponding Korean application 1020107023288.

Japanese language office action dated Jan. 31, 2012 and its English language translation issued in corresponding Japanese application 2006136982 cites the foreign patent documents above.

Japanese language office action dated Jan. 31, 2012 and its English language translation issued in corresponding Japanese application 2006136984 cites the foreign patent documents above.

Japanese language office action dated Jun. 26, 2012 and its English language translation issued in corresponding Japanese application 2006136984.

Korean language office action dated Feb. 27, 2013 and its English language translation issued in corresponding Korean application 1020107023288.

* cited by examiner

STREAM GENERATION METHOD, BROADCAST RECEIVING APPARATUS, AND DISPLAY METHOD

CROSS REFERENCE TO RELATED APPLICATION

This application claims priority to and the benefit of Japan Patent Applications No. 2006-136982 filed on May 16, 2006 and No. 2006-136984 filed on May 16, 2006, the entire content of which is incorporated herein by reference.

FIELD OF THE INVENTION

The present invention relates to a stream generation method using stream encryption, a broadcast receiving apparatus and a display method.

DESCRIPTION OP THE RELATED ART

Recently, digital broadcasting for a mobile terminal has been put to practical use. As an encryption method of program data on the digital broadcasting for a mobile terminal, a stream encryption method (see Japanese Patent Application Laid-open No. 2001-308846) is more desirable than a block encryption method generally used for transmitting contents over the Internet, when considering the performance of mobile terminal. The reason is that the stream encryption method has low processing load and can be easily implemented in software. However, when employing the stream encryption method, there is a need to match states of both stream encryption algorithms of an encryption apparatus and a decryption apparatus. Therefore, it is necessary to initialize the algorithm regularly in order to decrypt data properly.

DISCLOSURE OF THE INVENTION

Problems to be Solved by the Invention

In a broadcast system employing the stream encryption method, a user is considered to watch a broadcast program encrypted (scrambled) under a payment system where the user acquires a key for decrypting a desired program by paying for on the program basis, and watches the program using the key. Therefore, in the broadcast system using such a program-basis payment system, a user needs to previously purchase a key for a desired program encrypted by referring to program tables on newspaper, EPG or the like, and wait for the program to be started. For example, when "a pay encrypted program" for which a user has not purchased a key is started, the user cannot see the beginning part of the program even if he purchases the key by paying for it after the program is started. It is very disadvantageous to the user as well as being inconvenient. Moreover, in the view of program providers, due to a slight gap in times, they miss opportunity to sell programs to potential users who would be willing to pay and watch the programs.

Moreover, although a user purchased a key in advance, there is a risk that "the key purchase" would be in vain if the user misses the pay program or reception condition of radio signals is poor due to movement of a mobile broadcast receiving terminal and the like. Therefore, a user becomes reluctant to purchase a key in advance. With a stationary broadcast receiving apparatus, a user can surely watch a program using timer-recording function. However, it is very difficult to ensure for the above-described mobile broadcast receiving terminals, which are typically cell phones with a function for receiving one segment broadcasting, to record the program on time because they always moves with the user. Therefore, it would be desirable, when a user had a time to spare and intention to watch the pay program, if the user could make a decision to purchase the key at a time enough to acquire the key (generally while a program just before the pay program is on the air, in other words, just before the pay program is started) so that he could purchase the key smoothly and watch the program. However, such a technology has not been developed.

In the view of the above problem, an object of the present invention is to provide a technology (method and apparatus) which is capable of giving a chance to a user so that he can decide to purchase a key at a time enough to acquire the key when the user has a time to watch a pay program, and therefore, he can purchase the key smoothly and watch the program.

Means for Solving the Problem

To achieve the above object, the stream generation method comprises: storing an identifier of a key (an identifier for a current program) for decrypting stream-encrypted data (in other words, data encrypted by stream encryption method) of a current program in initialization packets for initializing stream encryption algorithm; inserting the initialization packets into a stream (transport stream, program stream or the like); and storing an identifier of a key (an identifier for a following program) for decrypting stream-encrypted data of a next program (in other words, next program, and optionally a couple of programs following it) in a predetermined initialization packet among the initialization packets.

(Moreover, the method may comprise generating a stream constructed by packets containing the steam-encrypted data of the current program and the initialization packets.)

The stream generation method according to one embodiment of the present invention, is characterized in that it further comprises a step of storing the identifier of the key for decrypting stream-encrypted data of the next program in the initialization packets at a predetermined interval.

The stream generation method according to another embodiment of the present invention is characterized in that it further comprise a step of storing the identifier of the key (an identifier for a following program) for decrypting stream-encrypted data of the next program in a last initialization packet to be inserted into the stream.

In here, it is preferable that a start notice flag for noticing start of a program from the next program in the predetermined initialization packet. A receiving apparatus can take a time for confirming whether a key of a following program has been acquired easily by checking the start notice flag.

As described above, solving means of the present invention are described as a method. However, the present invention can be implemented as an apparatus (system), a program, and a recording medium for storing the program substantially corresponding to the method. Therefore it will be understood that such modification and variations are considered to be within the scope of the invention.

For example, a broadcast receiving apparatus according to another embodiment where the present invention is implemented as an apparatus, comprises:

a reception unit (circuit, etc.) for receiving an initialization packet containing an initial value for initializing stream encryption algorithm and an identifier of a key (a key identifier for a current program) for decrypting stream-encrypted data of a current program, and a encrypted packet containing stream-encrypted data;

a memory unit (memory) for storing a key for decrypting stream-encrypted data;

a decryption unit (circuit, CPU executing commands of software modules, etc.) for initializing the stream encryption algorithm using the initial value contained in the initialization packet received, acquiring a key corresponding to the identifier of the key (a key identifier for a current program) for decrypting stream-encrypted data of the current program, which is contained in the received initialization packet, from the memory unit, and decrypting stream-encrypted data contained in the encrypted packet using the key;

(a monitoring unit for monitoring whether an identifier of a key (a key identifier for a following program) for decrypting stream-encrypted data of a next program, in the initialization packet;) and a control unit (circuit, CPU executing commands of software modules, etc.) for determining, when an identifier of a key (a key identifier for a following program) for decrypting stream-encrypted data of a next program is contained in the initialization packet, whether a key corresponding to the identifier is stored in the memory unit, and controlling a reporting unit (in other words, display unit, voice output unit, vibration unit etc.) to report the determination result.

In addition, the broadcast receiving apparatus is characterized, in that it comprises, a program information memory unit for storing program information (an EPG contained in a packet of a stream or acquired by a transmission unit via the Network, etc.), and wherein the control unit controls the reporting unit to report the determination result with program information corresponding to the identifier among program information stored in the program information memory unit.

The program information memory unit may be designed with the memory unit to be common.

The present invention can be implemented as a broadcast receiving apparatus. In other words, the broadcast receiving apparatus according to an embodiment, comprises:

a broadcast reception unit (a tuner or the like for receiving a video stream or a stream including data such as BML);

a display unit (or a voice output unit, a reporting unit such as vibration unit, etc.);

a memory unit (memory, etc.) for storing a key for decrypting stream-encrypted data (in other words, data encrypted by a stream encryption method) received by the broadcast reception unit;

a program information memory unit (memory, etc.) for storing program information (EPG contained in a packet of a stream or acquired by a transmission unit via the Network, etc);

a control unit (circuit, CPU executing commands of software modules, etc.) for controlling the display unit to display a video stream of a current program being received by the broadcast reception unit, information (title, sub-title, content, player and the like) of a following program (next program, or a couple of programs following it) scheduled to be broadcasted after the current program among program information stored in the memory unit (by referring to time information provided by a timing unit), and key acquisition information indicating whether a key for decrypting a stream (video stream, data such as BML, and the like) having steam-encrypted data of the following program has been acquired, and to display a message (for example, "The key has not been acquired when the key acquisition information indicates that the key has not been acquired. Please acquire the key for watching this program") for promoting acquisition of the key of the following program; and a key acquiring unit for acquiring a key for a following program (from a key distribute server by using a mobile communication unit and the like) indicated by the key acquisition information as a program whose key has not been acquired.

In here, the program information memory unit may be designed with the memory unit to be common.

In addition, the broadcast receiving apparatus according to yet another, embodiment of the present invention is characterized in that the control unit controls the display unit to display the message for promoting acquisition of the key for the following program on at least a portion of a region where the video stream is displayed.

The broadcast receiving apparatus according to still another embodiment of the present invention is characterized in that when detecting information (for example, a start notice flag of a following program or a key identifier of a following program, or the like) about the following program in data being received by the broadcast reception unit, the control unit controls the display unit to display program information of the following program and key acquisition information indicating whether a key for the following program has been acquired, as well as the video stream received by the broadcast reception unit.

The broadcast receiving apparatus according to still another embodiment of the present invention is characterized in that it further comprise a sensitivity detection unit for detecting reception sensitivity (of carriers which carry stream of a program) in the broadcast reception unit, and wherein the control unit controls that the key acquisition unit acquires the key for the following program (for example, the control unit permits operation for key acquisition only when the current reception sensitivity is above a predetermined threshold so that a user can watch the program in good condition) based on the reception sensitivity detected by the sensitivity detection unit.

The present invention can be implemented as a method, a program, and a recording medium for storing the program substantially corresponding to those. Therefore it will be understood that such modification and variations are considered to be within the scope of the invention.

For example, a display method of a broadcast receiving apparatus according to another embodiment where the present invention is implemented as a method, comprises:

displaying a video stream being received (by a broadcast reception unit of a broadcast receiving apparatus), information of a following program scheduled to be broadcasted after a current program (by referring to time information provided by a timing unit among program information stored in the memory unit), and key acquisition information indicating whether a key for decrypting a stream having stream-encrypted data of the following program is acquired or not on a display unit; and displaying a message for promoting acquisition of a key for a following program on the display unit when the key acquisition information indicates that the key has not been acquired.

Effect of the Invention

According to the present invention, provided is a framework where a user is informed whether a key has been purchased or not at a time enough to acquire the key (e.g. when a program just before the pay program is on the air, in other words, just before the pay program is started), so that the user can decide whether to purchase the key at the time and watch the program by purchasing the key smoothly, when the user has enough time to watch a pay program. Therefore, user's convenience is highly improved. Moreover, in the view of a program provider (content provider, program production company), the present invention can provide a chance to sell a pay program to "potential users who had a high possibility to purchase the program"; while they missed the users due to a slight gap in time, in other words by reason that the program whose key has not been purchased is started under the conventional system. In addition, since a mobile broadcast receiving apparatus (typically, a cell phone with a function for receiving television signals) moves, there are many cases that broadcasting reception condition cannot be set until it is immediately before watching the program, and that a user casually starts to watch a program when the user has enough time regardless of where he is. Therefore, it is very advantageous to a user and a program provider that the user can recognize whether a key has been acquired and decide to purchase the key at the time.

BEST MODE FOR CARRYING OUT THE INVENTION

Figure 1:
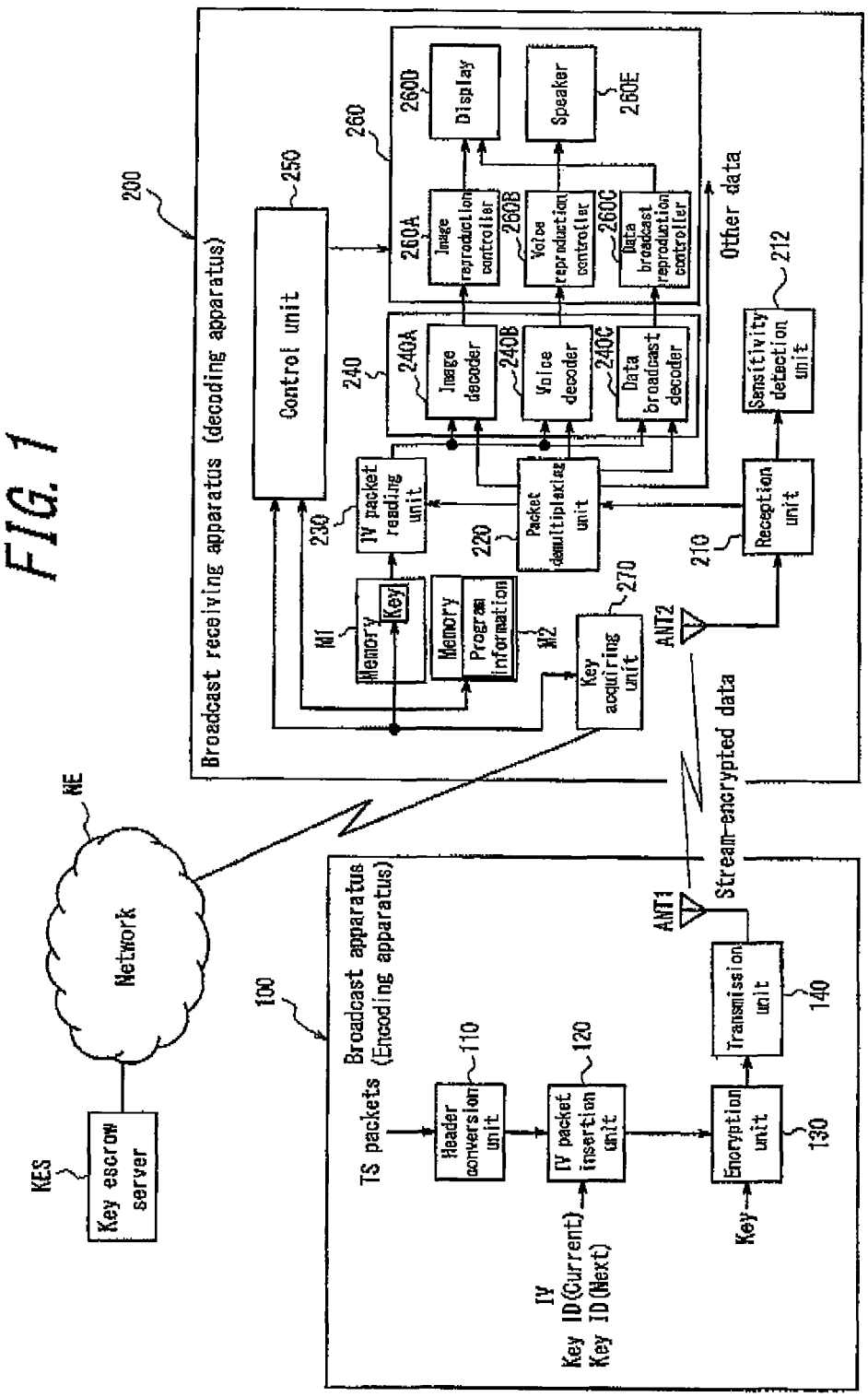
FIG. 1 shows a configuration of a broadcast system having a broadcast apparatus (encoding apparatus) suitable to employ a stream generation method according to the present invention, and a broadcast receiving apparatus.

Preferred embodiments of the present invention will now be described with reference to the accompanying drawings. FIG. 1 shows a configuration of a broadcast system having a broadcast apparatus (encoding apparatus) suitable to employ a stream generation method according to the present invention, and a broadcast receiving apparatus. As shown in FIG. 1, the broadcast system of this embodiment has the broadcast apparatus (encoding apparatus) 100 and the broadcast receiving apparatus (decoding apparatus) 200. The broadcast apparatus (encoding apparatus) 100 has a header conversion unit 110, an IV packet insertion unit 120, an encryption unit 130, a transmission unit 140 and an antenna ANT1. The header conversion unit 110 performs conversion of a header of a transport packet (TS packet). The TS packet is based upon ISO/TEC 13818-1 (MPEG-2 system Standard). The header conversion unit 110 rewrites a value in a transport_scrambling_control field of the TS packet header. The value of "01", "10" or "11" in a transport_scrambling_control field indicates that encryption is to be performed. The value of "00" in transport_scrambling_control field indicates that encryption is not to be performed.

The IV packet insertion unit 120 generates an initialization packet (IV packet) containing an initial value (IV: initial vector) to be used to initialize stream encryption algorithm at an initialization interval of the stream encryption algorithm. The IV packet insertion unit 120 stores a key ID in the IV packet. There are two kinds of key IDs, which are "Current" and "Next". The key ID of "Current" is an identifier of a key being currently used. The key ID "Next" is an identifier of a key to be used next. The IV packet insertion unit 120 inserts the generated IV packet into the TS packet stream outputted from the header conversion unit 110.

Figure 2:
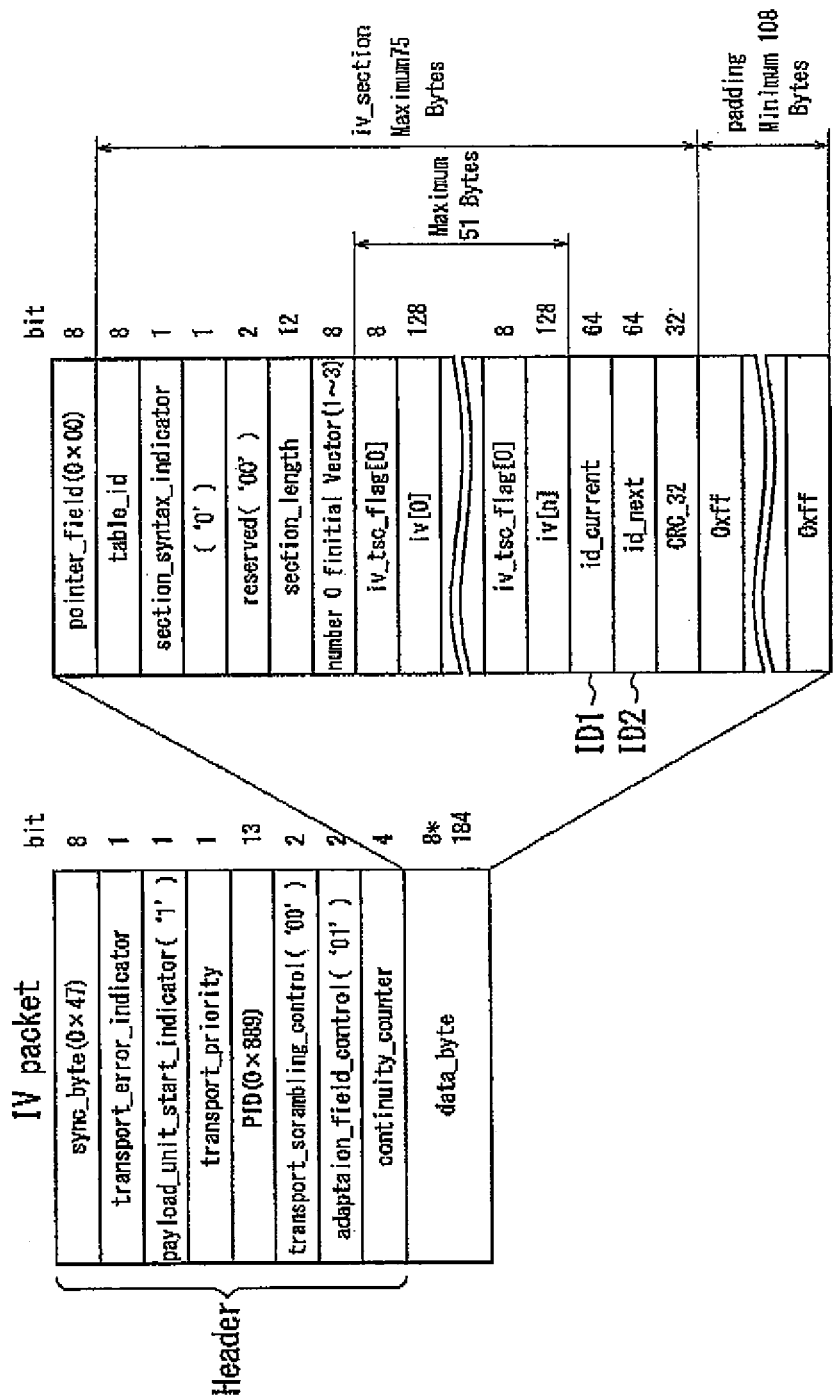
FIG. 2 exemplifies the structure of an IV packet used in the system of FIG. 1.

FIG. 2 exemplifies the structure of an IV packet used in the system of FIG. 1. In this example, the IV packet is constructed as a kind of TS packet. In FIG. 2, a PID field in a header is set to a value of "0x889(hex)" indicating an IV packet. The transport_scrambling_control field is set to "00". In other words, the IV packet is not to be encrypted. In this example, the adaptation_field_control field is fixed to "01", and adapation_field does not exist.

Referring to the example shown in FIG. 2, a data-byte field contains an IV(iv), an ID1 (id_current) indicating a current key identifier and an ID2 (id_next) indicating a key identifier for the next program. A plurality of IVs (iv[n]; n is an integer not less than zero) may be contained. When a plurality of IVs is contained, sets of iv_tsc_flag[n] and iv[n] are generated. Each of iv[n] may be used to initialize stream encryption algorithm in a corresponding stream encryption process.

The initialization interval can be changed for every iv[n]. In this case, only iv[n] on the initialization timing is stored in a IV packet. The initialization interval for each iv[n] is determined based on corresponding stream encryption process. For example, the initialization interval may be determined based on media types of data to be encrypted. As the media types, for example, there are voices, images, data and the like.

In FIG. 2, not-used fields of the data_byte field are padded with the value of "0xff(hex)". And, "Cyclic Redundancy Check: CRC" (CRC 32) for error detection is also stored in the data_byte field. When an error is detected as the result of CRC check at a receiver side of the IV packet, the IV packet will be discarded.

Returning to the explanation of FIG. 1, the encryption unit 130 performs stream encryption for TS packet stream after the IV packet is inserted. Objects of the encryption are TS packets whose transport_scrambling_control fields set to "01", "10" or "11". The TS packet header is not encrypted. Moreover, the IV packet is not encrypted as the transport_scrambling_control field is set to "00".

In the stream encryption process, when the encryption unit 130 detects an IV packet (whose PID field has the value of "0x889(hex)) in TS packet stream, it reads out an IV from the detected IV packet. And, the encryption unit 130 initializes the stream encryption algorithm using the IV. In other words, since the stream encryption algorithm is initialized at the point where the IV packet is located in, the TS packet steam, the stream encryption is performed for TS packets set to be encrypted and located after the IV packet. When the stream encryption algorithm is initialized, a key identifier ID1 (id_current) of the current program and a key identifier ID2 (id_next) of next program are read out, and then a key to be used for stream encryption is prepared.

The encryption unit 130 may have a plurality of stream encryption processes[n]. In each stream encryption process [n], the stream encryption algorithm is initialized using each corresponding IV (iv[n]). Moreover, in each stream encryption process[n], it is determined whether a TS packet has to be encrypted or not according to a value of a PID field. The encryption unit 130 outputs a TS packet stream including an IV packet and an encrypted TS packet to the transmission, unit 140 in the order of reception from the IV packet insertion unit 120. The transmission unit 140 transmits (broadcasts) the TS packet stream (stream-encrypted data) received from the encryption unit 130 via the antenna ANT1.

Now, construction of the broadcast receiving apparatus (decoding apparatus) 200 will be explained. As shown in FIG. 1, the broadcast receiving apparatus (decoding apparatus) 200 has an antenna ANT2, a reception unit 210, a sensitivity detection unit 212, a packet demultiplexing unit 220, an IV packet reading unit 230, a decoding unit 240, a control unit 250, a reproduction unit 260, a key acquiring unit 270, a memory M1 and a memory M2. The reception unit 210 receives TS packets transmitted from the broadcast apparatus (encoding apparatus). The reception unit 210 performs a process for error detection and error correction for the received TS packets. At this time, a packet where an error is detected by CRC check is discarded. The sensitivity detection unit 212 detects the reception sensitivity of carriers carrying the stream-encrypted data received by the reception unit 210, and outputs the result to the control unit 250. The control unit 250 does not permit that the key acquiring unit 270 acquires a key, based on the reception sensitivity, for example, when the reception sensitivity does not exceed a threshold value to ensure that a user can watch a program. When the control unit 250 permits to acquire a key, the key acquiring unit 270 acquires the key for decryption from a key escrow server KES through the Network NE (the Internet and the like).

The packet demultiplexing unit 220 demultiplexes TS packets outputted from the reception unit 210 to corresponding destination based on values of PID fields in headers. In here, an IV packet (whose PID field has the value of "0x889 (hex)") is outputted to the IV packet reading unit 230. And, encrypted TS packets (whose transport-scrambling-control fields are set to "01", "10" or "11") are outputted to the decoding unit 240 corresponding to the value of the PID field. And, other TS packets not encrypted are outputted from the broadcast receiving apparatus (decoding apparatus) 200, as they are.

The IV packet reading unit 230 reads out an IV and key IDs of "Current" (id_current) and "Next" (id_next). The IV packet reading unit 230 prepares a key to decrypt stream-encrypted stream from the key IDs of "Current" (id_current) and "Next" (id_next). And then, the IV packet reading unit 230 outputs the prepared key and the IV to the decoding unit 240. In here, when the IV packet contains a plurality of IVs (iv[n]), the IV packet reading unit 230 outputs each iv[n] to a corresponding decoding unit 240 which performs decoding process[n] corresponding to the iv[n].

The decoding unit 240 receives encrypted TS packets from the packet demultiplexing unit 220 and decodes the stream encryption. In the decoding process of stream encryption, when the decoding unit 240 receives the IV and the key from the IV packet reading unit 230, it initializes the stream encryption algorithm using the IV. And then, when the initialization is complete, the decoding process of the encrypted stream is started with the key from the IV packet reading unit 230. In other words, since the stream encryption algorithm is initialized at the point where the IV packet is located in the received TS packet stream, decoding process of stream encryption is started for encrypted TS packets located after the IV packet.

The decoding unit 240 has an image decoder 240A, a voice decoder 240B and a data broadcast decoder 240C, and each of which decodes TS packets and outputs to the reproduction unit 260.

The reproduction unit 260 performs reproduction of decoded TS packets. In the embodiment shown in FIG. 1, the reproduction unit 260 has an image reproduction controller 260A, a voice reproduction controller 260B and a data broadcast display controller 260C. The image reproduction controller 260A, the voice reproduction controller 260B and the data broadcast display controller 260C control reproduction of TS packets outputted from corresponding decoders 240, respectively. The reproduction is performed through display unit 260D and a speaker 260E. The configuration of the reproduction unit 260 shown in FIG. 1 is an example, so that the kinds of media may be changed arbitrarily. Moreover, the control unit 250 controls the entire broadcast receiving apparatus 200 (In other words, all blocks included in the apparatus are controlled by the control unit 250)

According to the embodiment described above, it is possible to match the state of stream encryption algorithm in the decoding process with the state of stream encryption algorithm in the encoding process by using the IV packets. Therefore, although the states of both stream encryption algorithms are temporarily mismatched each other since there is a loss of TS packet due to transmission error or the like, the states of both stream encryption algorithms can be matched when the next IV packet is received, so that the decoding process can be restarted in the normal state. Accordingly, in the stream encryption system, the resilience for the loss of transmission data caused by transmission error and the like can be improved.

Figure 3:
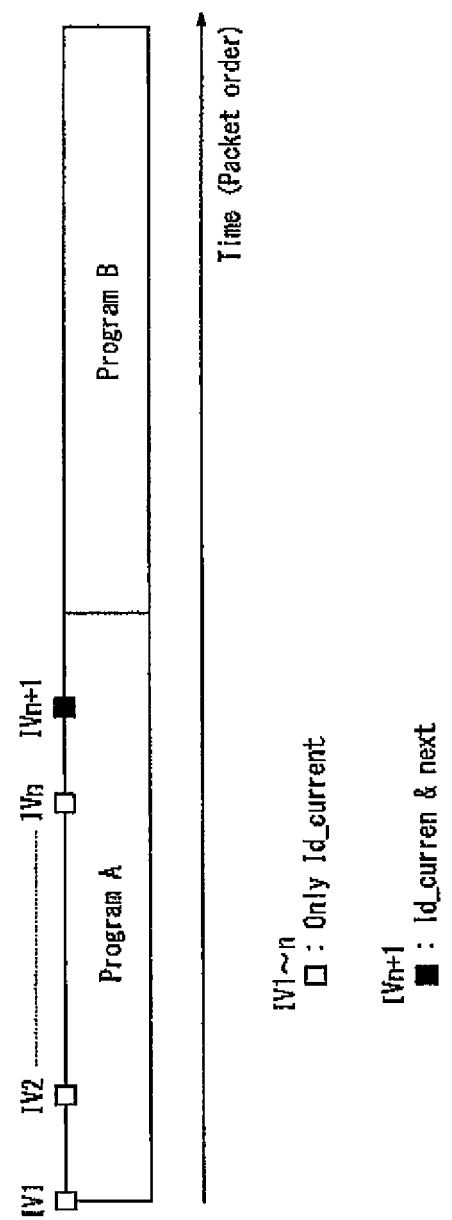
FIG. 3 is a timing chart of packets included in a stream generated by the stream generation method (broadcast apparatus/encoding apparatus) according the present invention.

FIG. 3 is a tuning chart (arrangement order) of packets included in a stream generated by the stream generation method (broadcast apparatus/encoding apparatus) according the present invention. As shown in FIG. 3, a stream of program A is firstly generated, and then a stream of program B is generated. An initialization vector IV1 (in other words, a packet containing the IV1) containing only an identifier id_current of a key for the current program is arranged in the front part of the program A. And then, the same initialization vectors are inserted in the stream at a regular interval, so that n initialization vectors IV1-IVn are arranged in the stream. When being close to the start of program B, a packet containing two identifiers, the id_current and an identifier id_next of a key for the next program like the initialization packet IVn+1, is arranged at a predetermined timing. The timing can be determined as a point when the remaining time is less than a predetermined value before the program B is started, or when the number of remaining packets is less than a predetermined value before packets of the program B are transmitted. Moreover, the packet containing two identifiers can be also decided as the last IV packet that initializes the stream encryption algorithm for the encrypted (scrambled) program. By keeping monitoring on whether there is an identifier id_next for the next program, the receiving apparatus can easily recognize that it is close to the start time of next program B. Soon after recognizing the fact, the receiving apparatus checks whether a key of the next program has been already purchased, and informs a user of the result. Therefore, it is possible to promote a user to purchase the key when it has not been purchased.

Figure 4:
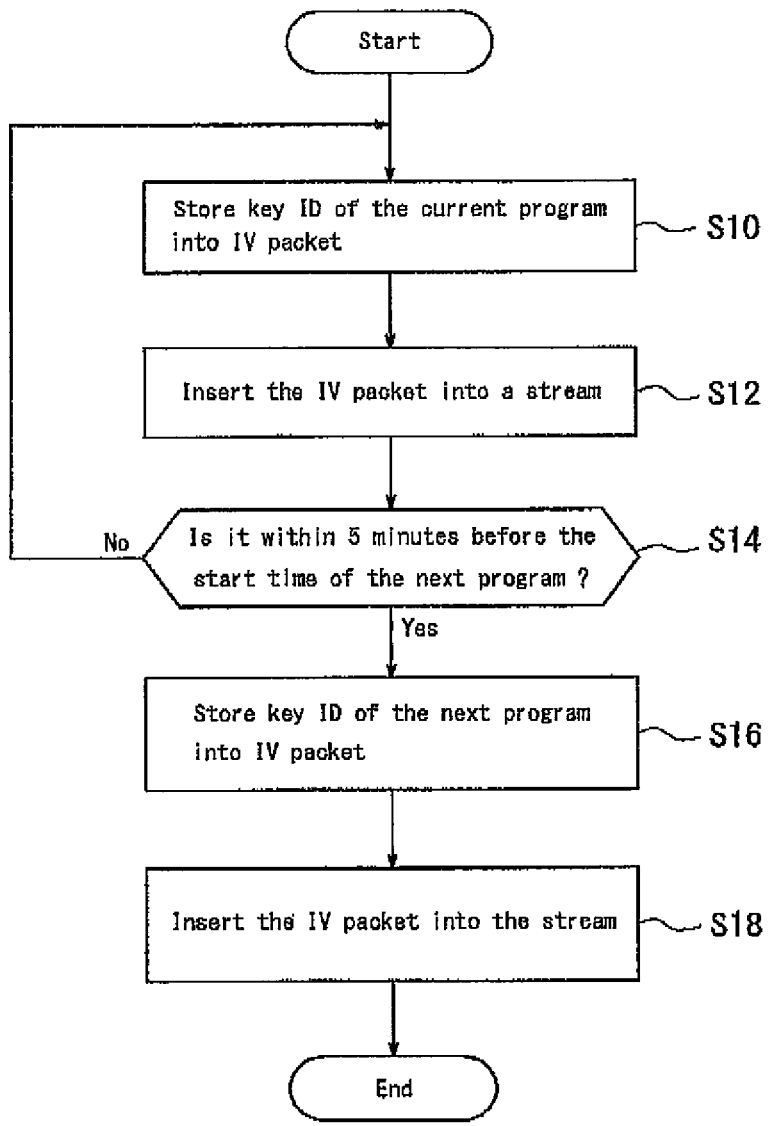
FIG. 4 is a flow chart showing a process of the stream generation method (broadcast apparatus/encoding apparatus) according to the present invention.

FIG. 4 is a flow chart showing a process of the stream generation method (broadcast apparatus/encoding apparatus) according to the present invention. Referring to FIG. 4, at step S10, a key ID (identifier) of a current program is stored in an IV packet. And then, the IV packet is inserted into the stream (S12). At step S14, it determines whether the remaining time is less than 5 minutes before the start time of the next program, and repeats steps S10, S12 until the condition is met. At step S14, when it is determined that the remaining time is less than 5 minutes before the next program is started, the process flow proceeds to step S16, stores a key ID of the next program as well as the key ED of the current program in the IV packet. And then, the IV packet containing two IDs is inserted into a stream (S18).

Figure 5:
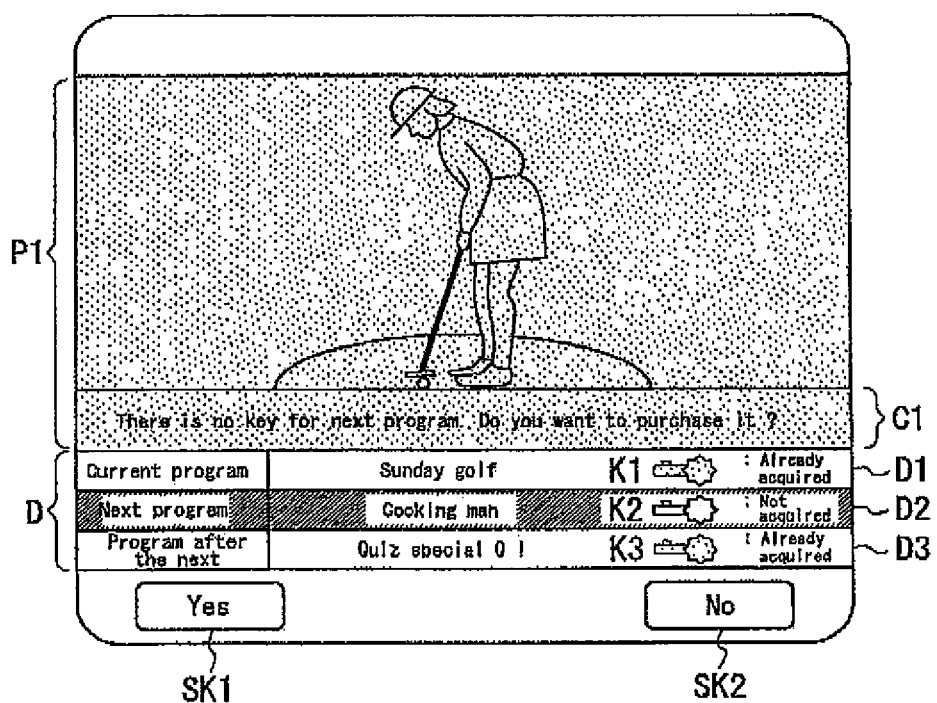
FIG. 5 exemplifies a configuration of screen display of the broadcast receiving apparatus according to the present invention.

FIG. 5 exemplifies a configuration of screen display of the broadcast receiving apparatus according to the present invention. As shown, the current program "Sunday golf" is displayed on an image display region P1. On a current program field D1 in a data display region D, it is displayed that the key is needed (regardless of whether it is with or without pay) to play the current program and that the key has been already acquired. FIG. 5 shows the screen display when the start time of a next program "cooking man" comes near and after a packet containing a key identifier of the next program is detected. On the next program field D2, it is displayed that the key K2 of the next program has not been acquired. Moreover, it is displayed that a key K3 of the program "quiz special Q" after the next program has been acquired on the program field D3. In the image display region P1, a message C1 that informs a user that the key of the next program has not been acquired and promotes the user to acquire (purchase) the key is displayed. By seeing the message, a user who decided to purchase the key pushes down a soft key SK1, and a user who decided not to purchase the key pushes down a soft key SK2.

Figure 6:
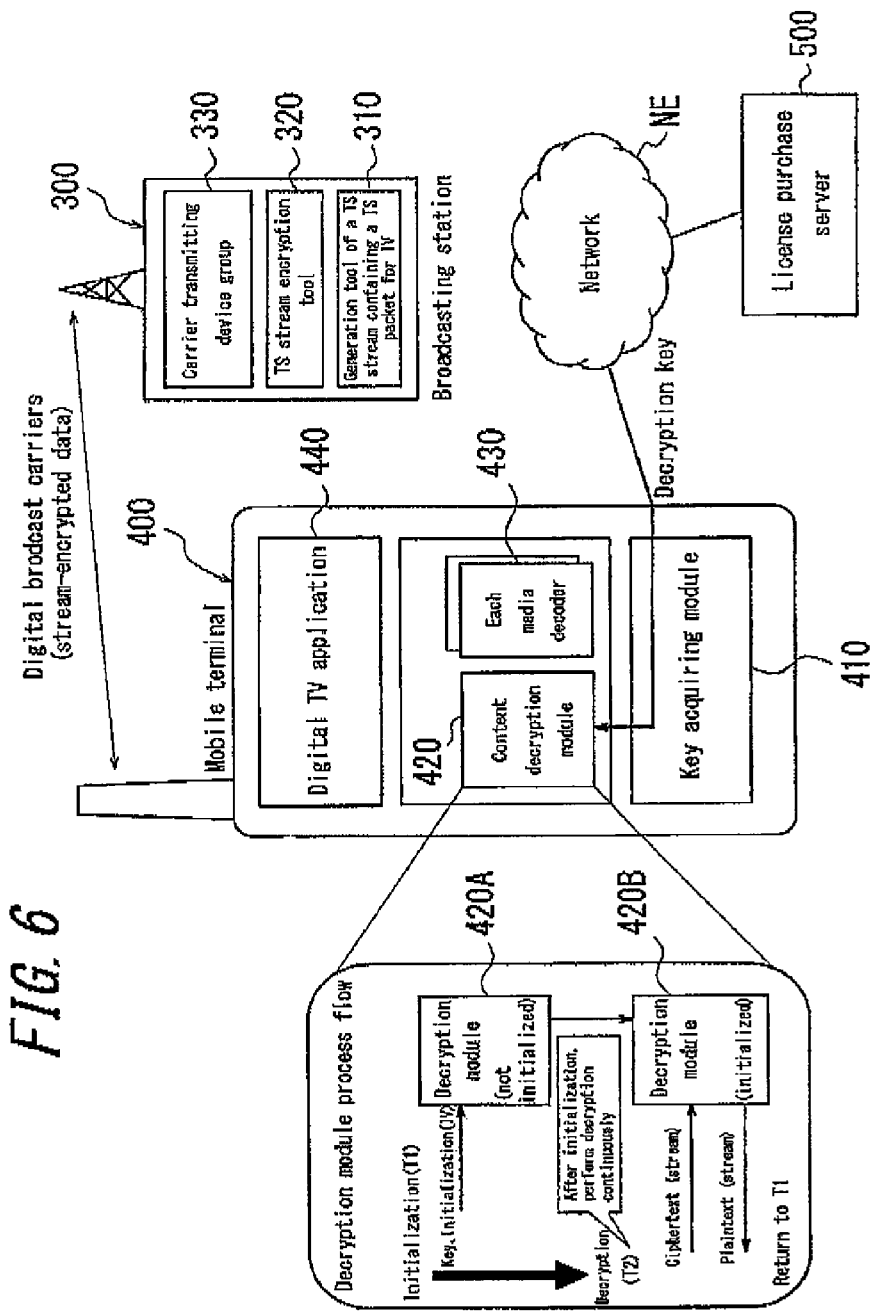
FIG. 6 is a block diagram showing a configuration of a digital broadcast system for a mobile terminal according to the present invention.

FIG. 6 is a block diagram showing a configuration of a digital broadcast system for a mobile terminal according to the present invention. Referring to FIG. 6, a user acquires a decryption key corresponding to desired content previously from a license purchase server 500 through the network NE. In the mobile terminal 400, a key acquiring module 410 accesses to the license purchase server 500 through the network NE such as the Internet, and downloads the decryption key. The decryption key is provided to a content decryption module 420. The decryption key may be with or without pay.

In the broadcasting station 300, a generation tool 310 of a TS stream containing a TS packet for an IV inserts an IV packet (TS packet for an IV) generated into a TS packet stream (TS stream) constructed by TS packets that contain content. The TS stream where the IV packet has been inserted (TS stream containing the TS packet for the IV) is stream-encrypted by the TS stream encryption tool 320. After the encryption process, the TS stream containing the TS packet for the IV is transmitted by being carried on digital broadcast carriers by a carrier transmitting apparatus group 330.

In the mobile terminal 400, a digital TV (television) application 440 receives "encrypted TS stream containing a TS packet for IV" carried on digital carriers. The content decryption module 420 decrypts stream encryption for the "encrypted TS stream containing a TS packet for IV". After the decryption process, content contained in the TS stream is reproduced by a media decoder 430 based on kinds of media.

Next, the process flow of the content decryption module 420 will be explained. As shown in FIG. 6, the process flow in the decryption module comprises an initialization step T1 and a decryption step K2. At the initialization step T1, a decryption module 420A that has not been initialized is initialized using the decryption key received from the key-acquiring module 410 and the IV contained in the TV packet in the "encrypted TS stream containing a TS packet for IV". Thus, an initialized decryption module 420B is acquired. The decryption modules 420A, 420B have stream encryption algorithm.

At the decryption step T2, stream-encrypted ciphertext is decrypted by the initialized decryption module 420B, and the decryption result is outputted as a stream format. The stream-encrypted ciphertext is acquired from the encrypted TS packet included in "encrypted TS stream containing a TS packet for IV". Under the process of step T2, when a new IV packet is received and an IV is acquired, the process flow returns to the initialization step T1, and the decryption module 420A is initialized again.

According to the present invention, although there is a loss of a TS packet containing stream-encrypted data due to a transmission error or the like in the digital broadcasting, so that states of stream encryption algorithms of a broadcasting station and a mobile terminal are not mismatched each other, and reception condition of digital broadcasting is unstable temporarily, it is possible to match states of stream encryption algorithms of the broadcasting station and the mobile terminal using the next IV packet, so that the reception condition of digital broadcasting is recovered to be stable. Therefore, it is possible to improve the service quality of digital broadcasting for a mobile terminal.

While the invention has been described with reference to exemplary embodiments and drawings, it will be understood by those skilled in the art that many various modifications and extensions of the above-described technology may be implemented using the teaching of this invention. All such modifications and extensions are intended to be included within the true spirit and scope of the appended claims. For example, functions included in each unit, unit, step and the like can be rearranged not to be contradictory logically. And, a plurality of unit, steps and the like can be combined or divided.

The invention claimed is:

1. A broadcast receiving apparatus comprising: a broadcast reception unit;
   a display unit;
   a memory for storing a key for decrypting stream-encrypted data received by the broadcast reception unit;
   a program information memory for storing program information;
   a controller for controlling the display unit to display on a same screen at a same time a video stream of a current program being received by the broadcast reception unit, along with display of information of a following program scheduled to be broadcasted after the current program among program information stored in the memory unit, and along with display of key acquisition information indicating whether a key for decrypting a stream having stream-encrypted data of the following program has been acquired on the same screen at the same time as display with the current program, and to display a message for promoting acquisition of the key of the following program when the key acquisition information indicates that the key has not been acquired; and
   a key acquiring unit for acquiring a key for a following program indicated by the key acquisition information as a program whose key has not been acquired.

2. The broadcast receiving apparatus of claim 1, wherein the controller controls the display unit to display the message for promoting acquisition of the key for the following program on at least a portion of a region where the video stream is displayed.

3. The broadcast receiving apparatus of claim 1, wherein when detecting information about the following program in data being received by the broadcast reception unit, the controller controls the display unit to display program information of the following program and key acquisition information indicating whether a key for the following program has been acquired, as well as the video stream received by the broadcast reception unit.

4. The broadcast receiving apparatus of claim 1, further comprising a sensitivity detection unit for detecting reception sensitivity in the broadcast reception unit, and wherein the controller controls that the key acquisition unit acquires the key for the following program based on the reception sensitivity detected by the sensitivity detection unit.

5. A display method of a broadcast receiving apparatus comprising: displaying on a same screen at a same time a video stream being received, along with information of a following program scheduled to be broadcasted after a current program, and along with key acquisition information indicating whether a key for decrypting a stream having stream-encrypted data of the following program is acquired or not on the same screen of a display unit and at the same time as display with the current program; and displaying a message for promoting acquisition of a key for a following program on the display unit when the key acquisition information indicates that the key has not been acquired.

* * * * *